United States Patent [19]

Boehm

[11] 4,170,424
[45] Oct. 9, 1979

[54] PARACHUTE ATTACHMENT SWIVEL

[75] Inventor: Helmut Boehm, Thousand Oaks, Calif.

[73] Assignee: The United States of America as represented by the Secretary of the Navy, Washington, D.C.

[21] Appl. No.: 652,035

[22] Filed: Jan. 26, 1976

[51] Int. Cl.² ............................ F16D 1/12; F16D 3/00
[52] U.S. Cl. .................................... 403/164; 403/288
[58] Field of Search ............... 403/164, 165, 166, 288; 73/170 R, 170 A; 324/0.5 E; 174/61, 63; 294/67 D, 67 DA, 67.4; 285/190, 122, 123, 272-282; 248/131, 318

[56] References Cited
U.S. PATENT DOCUMENTS

| | | | |
|---|---|---|---|
| 3,118,641 | 1/1964 | Barish | 403/164 X |
| 3,138,423 | 6/1964 | Samuelson et al. | 403/369 X |
| 3,235,297 | 2/1966 | Fernberg | 403/164 |
| 3,297,293 | 1/1967 | Andrews et al. | 403/164 X |
| 3,836,268 | 9/1974 | Behnke | 403/165 |
| 3,906,790 | 9/1975 | Brainard et al. | 73/170 A |

*Primary Examiner*—Wayne L. Shedd
*Attorney, Agent, or Firm*—Richard S. Sciascia; J. M. St.Amand; William W. Cochran, II

[57] ABSTRACT

A swivel attached to a hermetically sealed device dropped from high altitudes to suspend the device from a parachute and allow free rotation of the device to prevent twisting and entanglement of the parachute during descent.

8 Claims, 2 Drawing Figures

PARACHUTE ATTACHMENT SWIVEL

BACKGROUND OF THE INVENTION

The present device pertains generally to swivels and more particularly to a swivel capable of withstanding high impact forces while providing a hermetical seal.

In the design of electronic equipment, it is often necessary to provide a hermetically sealed unit in which the electronic equipment can be stored. Atmospheric pressure and desired humidity can be sealed in the electronic unit to prevent problems such as breakdown and corona buildup that occurs with the low pressures that are associated with the high altitudes at which the device is used. In addition, a hermetically sealed unit is often needed to encapsulate a cooling liquid necessary in the device to create a steady state temperature condition, preventing instability and, in many cases, thermo-runaway. Also, a hermetically sealed unit is desirable since the shelf life of the unit can be extended by preventing the day-to-day changes in atmospheric pressure and humidity which affect hydroscopic changes in the battery cells stored within the unit. Finally, a hermetically sealed unit allows the jamming device to float to aid in recovery of the unit thereby allowing the device to be reused numerous times to reduce the system's overall cost.

It is therefore desirable to provide a means for attaching a parachute to the device in a manner which allows the unit to be hermetically sealed. Standard attachment rings affixed in a stationary manner to the unit have caused the parachute riser and shroud lines to become twisted or entangled due to the rotation of the device. Conventional swivel devices which have been used to attach the parachute to the unit have not provided the necessary hermetical seal required by the unit and, in addition, have not been able to withstand the forces created upon the opening of the parachute. Swivels which can withstand these initial opening forces have provided neither the hermetical seal nor the low friction rotational freedom required to prevent entanglement of the parachute during descent.

SUMMARY OF THE INVENTION

The present invention overcomes the disadvantages and limitations of the prior art by providing an improved parachute attachment swivel. This is accomplished through the use of the combination of a parachute attachment device which is connected to a threaded rotatable shaft. The rotatable shaft is inserted through an O-ring seal comprising either silicone or viton which hermetically seals the shaft from the outside atmosphere. A roller thrust bearing, comprising a series of needle bearings, is sandwiched between a locking nut and the inside of the unit's housing and provides a low friction bearing on which the unit can rotate when suspended by the parachute attachment device. The overall system provides an attachment for the parachute to the unit which can withstand high impact forces without breaking the hermetical seal.

It is therefore an object of the present invention to provide an improved parachute attachment swivel.

It is also an object of the present invention to provide an improved parachute attachment swivel having a hermetical seal.

Another object of the present invention is to provide an improved parachute attachment swivel which can withstand high impact forces.

Another object of the present invention is to provide an improved parachute attachment swivel which allows free rotational movement during descent.

Other objects and further scope of applicability of the present invention will become apparent from the detailed description given hereinafter. The detailed description indicating the preferred embodiment of the invention is given only by way of illustration since various changes and modifications within the spirit and scope of the invention will become apparent to those skilled in the art from the detailed description. The foregoing abstract of the disclosure is for the purpose of providing a non-legal brief statement to serve as a searching, scanning tool for scientists, engineers and researchers, and is not intended to limit the scope of the invention as disclosed herein nor is it intended to be used in interpreting or in any way limiting the scope or fair meaning of the appended claims.

DETAILED DESCRIPTION OF THE PREFERRED EMBODIMENT

Figure 1:
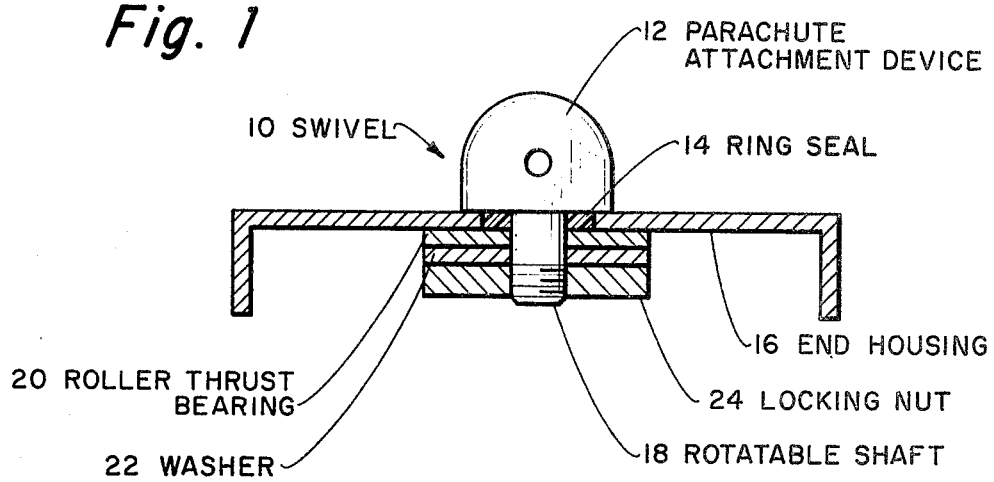
FIG. 1 is a schematic diagram of the overall system of the preferred embodiment of the invention.

FIG. 1 illustrates a schematic diagram of the preferred embodiment of the invention. As shown therein, swivel 10 comprises a parachute attachment device 12 which is connected to a rotatable shaft 18. The shaft 18, as shown in FIG. 1, is threaded and force-fit through a ring seal 14 mounted within the end housing 16 of the unit. The ring seal 14 provides a low friction hermetical seal between the inside of the unit and the outer atmosphere. At the same time, it allows the swivel 10 to rotate freely without breaking the hermetical seal. The end housing 16 is connected to the remaining portion of the unit and provides a support for the swivel 10. The roller thrust bearing 20 is placed between a washer 22 and the end housing 16 to provide a low friction means of support for the swivel when pressure is applied vertically, as shown in FIG. 1. The locking nut 24 is the end support on the shaft 18 of the swivel 10, preventing the shaft from being pulled through the end housing 16. In this manner, the device provides a hermetical seal between the end housing 16 and the swivel 10 while still providing a means of support which can withstand high impact forces.

Figure 2:
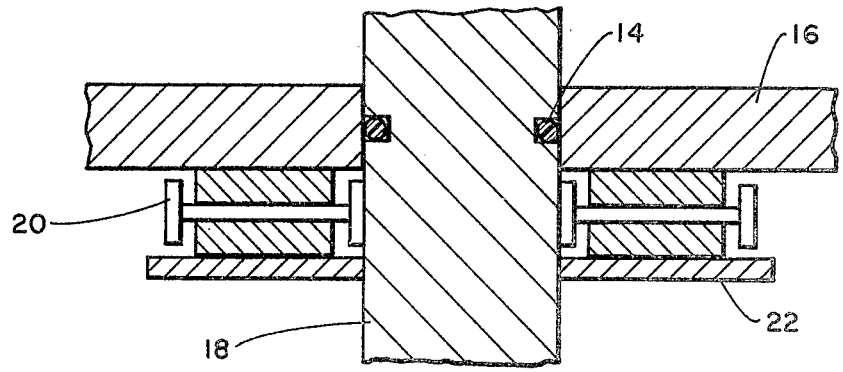
FIG. 2 is the detailed drawing of the roller thrust bearing of an alternative embodiment of the invention.

FIG. 2 is a schematic drawing of the hermetical seal and roller thrust bearing of an alternative embodiment of the invention. As shown therein, the shaft 18 is indented to accommodate an O-ring seal 14 which can be made of silicone-rubber, viton or similar sealing material. The O-ring seal 14 is fitted within a groove in the shaft 18 to provide a tight-fitting seal between the shaft 18 and the outer housing 16. Silicone and viton provide the necessary elasticity at the extreme temperatures which the device is subjected to, i.e., as low as −50° C. The roller thrust bearing 20 comprises a series of cylindrical needle bearings enclosed in a circular array to fit around the shaft 18. The roller thrust bearing 20, in this manner, provides a bearing which is capable of withstanding extreme forces which can be created by the opening of the parachute while still providing a low frictional means of supporting the swivel from the end housing 16.

The device of the preferred embodiment therefore allows the parachute to support the hermetically sealed object with a low friction swivel which prevents parachute entanglement upon descent by allowing the unit to rotate freely. Furthermore, the swivel is capable of withstanding high impact forces without breaking the hermetical seal of the device.

Obviously many variations and modifications of the present invention will become apparent to those skilled in the art from the preferred embodiment of the invention. It is therefore to be understood that within the scope of the appended claims the invention may be practiced otherwise than as specifically described herein.

What is claimed is:

1. A swivel for attaching a parachute to a hermetically sealed housing to prevent entanglement of said parachute comprising:
   (a) means for attaching said parachute to said swivel;
   (b) a rotatable shaft connected to said means for attaching said parachute, said shaft disposed within an aperture in said housing;
   (c) means for securing said shaft to said housing;
   (d) a roller thrust bearing disposed between said means for securing and said housing such that said housing rotates freely from said swivel preventing parachute entanglement; and
   (e) meand disposed within said aperture for providing a hermetical seal between the interior of said housing and the atmosphere outside said housing; wherein said swivel provides a low friction attachment to said housing capable of withstanding high impact forces created by said parachute.

2. The swivel of claim 1 wherein said means for securing comprises a locking nut.

3. A swivel for supporting an electronic device from a parachute comprising:
   (a) a shaft which protrudes through a housing of said device;
   (b) parachute attachment means connected to said shaft for releasably connecting said parachute to said swivel;
   (c) a ring seal disposed around said shaft and contiguous with said housing to form a hermetical seal between the interior of said housing and the atmosphere outside said housing where said swivel attaches to said device;
   (d) a locking nut secured to said shaft; and
   (e) roller thrust bearing means disposed between said locking nut and said housing of said device to allow said swivel to rotate freely, preventing entanglement of said parachute.

4. The swivel of claim 3 wherein said ring seal comprises a silicone ring.

5. The swivel of claim 3 wherein said ring seal comprises a viton ring.

6. The swivel of claim 1 wherein said means disposed within said aperture for providing a hermetical seal comprises a ring seal disposed around said shaft and contiguous with said housing.

7. The swivel of claim 6 wherein said ring seal comprises a silicone-rubber ring.

8. The swivel of claim 6 wherein said ring seal comprises a viton ring.